(12) United States Patent
Zhang et al.

(10) Patent No.: US 9,796,368 B2
(45) Date of Patent: Oct. 24, 2017

(54) METHOD AND SYSTEM FOR AN ASPIRATOR FOR A BRAKE BOOSTER

(71) Applicant: Ford Global Technologies, LLC, Dearborn, MI (US)

(72) Inventors: Xiaogang Zhang, Novi, MI (US); Brad Alan VanDerWege, Plymouth, MI (US); Joseph Norman Ulrey, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 95 days.

(21) Appl. No.: 14/941,238

(22) Filed: Nov. 13, 2015

(65) Prior Publication Data

US 2017/0137010 A1 May 18, 2017

(51) Int. Cl.
    F02M 35/10 (2006.01)
    B60T 13/52 (2006.01)
    B60T 13/57 (2006.01)

(52) U.S. Cl.
    CPC .............. B60T 13/52 (2013.01); B60T 13/57 (2013.01)

(58) Field of Classification Search
    CPC .... F02B 33/446; F02B 33/44; F02D 41/0007; F02M 35/10032; F02M 35/10091; F04F 5/20; F04F 5/24; B60T 13/46; B60T 13/52; B60T 17/02
    USPC ......... 123/559.1, 564–567, 184.21, 123/184.24–184.26, 41.01; 60/598, 600
    See application file for complete search history.

(56) References Cited

U.S. PATENT DOCUMENTS

| | | | |
|---|---|---|---|
| 6,857,415 B2 | 2/2005 | Kayama et al. | |
| 2011/0132311 A1* | 6/2011 | Pursifull | F02D 31/005 123/184.56 |
| 2013/0233287 A1* | 9/2013 | Leone | F02M 25/08 123/520 |
| 2014/0360607 A1 | 12/2014 | Fletcher et al. | |
| 2015/0083094 A1* | 3/2015 | Pursifull | F02D 23/00 123/559.1 |
| 2015/0159677 A1* | 6/2015 | Hampton | F04F 5/20 417/182 |
| 2015/0204283 A1* | 7/2015 | VanDerWege | F02M 35/10144 123/445 |
| 2016/0061164 A1* | 3/2016 | Fletcher | F02M 25/0706 123/568.11 |
| 2016/0298656 A1* | 10/2016 | Fletcher | F04F 5/20 |
| 2017/0122153 A1* | 5/2017 | Hampton | F01M 13/021 |
| 2017/0138277 A1* | 5/2017 | Zhang | F02D 41/0002 |

* cited by examiner

*Primary Examiner* — John Kwon
(74) *Attorney, Agent, or Firm* — Julia Voutyras; McCoy Russell LLP

(57) ABSTRACT

Methods and systems are provided for providing vacuum to a brake booster via an aspirator system. In one example, a system may include an aspirator system fluidly coupled with a brake booster with no intervening components located therebetween.

4 Claims, 5 Drawing Sheets

METHOD AND SYSTEM FOR AN ASPIRATOR FOR A BRAKE BOOSTER

FIELD

The present description relates generally to an aspirator for a brake booster.

BACKGROUND/SUMMARY

Vehicle control systems may be configured to start an engine assuming a given intake manifold volume. However, interactions between vacuum levels in a brake booster and the intake manifold pressure at engine starts can cause variability in the air charge, and consequently air-to-fuel ratio at the engine starts. As such, this increases exhaust emissions.

One approach to address this variability is shown by Kayama et al. in U.S. Pat. No. 6,857,415. Therein, a valve is placed between the brake booster and the intake manifold to equalize the (remaining) pressure in the brake booster to atmospheric levels or to remove air from the intake manifold to the brake booster.

However, the inventors herein have identified a potential issue with such an approach. As one example, the valve used in the approach of Kayama et al. does not allow the level of intake manifold pressure (MAP) to be set from one engine start to another engine start. As another example, even with the valve, a consistent MAP level may not be attained at engine starts occurring at high altitudes as well as at sea level. Further, the valve may be controlled by a control system with electric signals which may increase an overall cost of production.

In one example, the issues described above may be addressed by an aspirator system comprising a volute shaped aspirator with a linear aspirator protruding through a spiral of the volute aspirator, the linear aspirator comprising a venturi passage fluidly coupled to a brake booster, and where the aspirators are fluidly coupled to front or rear grills via a conical aspirator with no other intervening components located therebetween. In this way, vacuum may be provided to the brake booster without flowing suck flow from the brake booster to an engine or any components of the engine.

As one example, the aspirators receive motive flow through the front grill and generate vacuum based on geometries of the linear aspirator, the volute aspirator, and the conical aspirator. The vacuum may be provided to the brake booster when the check valve is open based on a vacuum of the brake booster being less than a minimum threshold vacuum. The vacuum draws suck flow from the brake booster to the aspirator system. The suck flows mixes with the motive flow and flows through the aspirators and out the rear grill without flowing through any other components.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 is shown approximately to scale.

DETAILED DESCRIPTION

Figure 1:
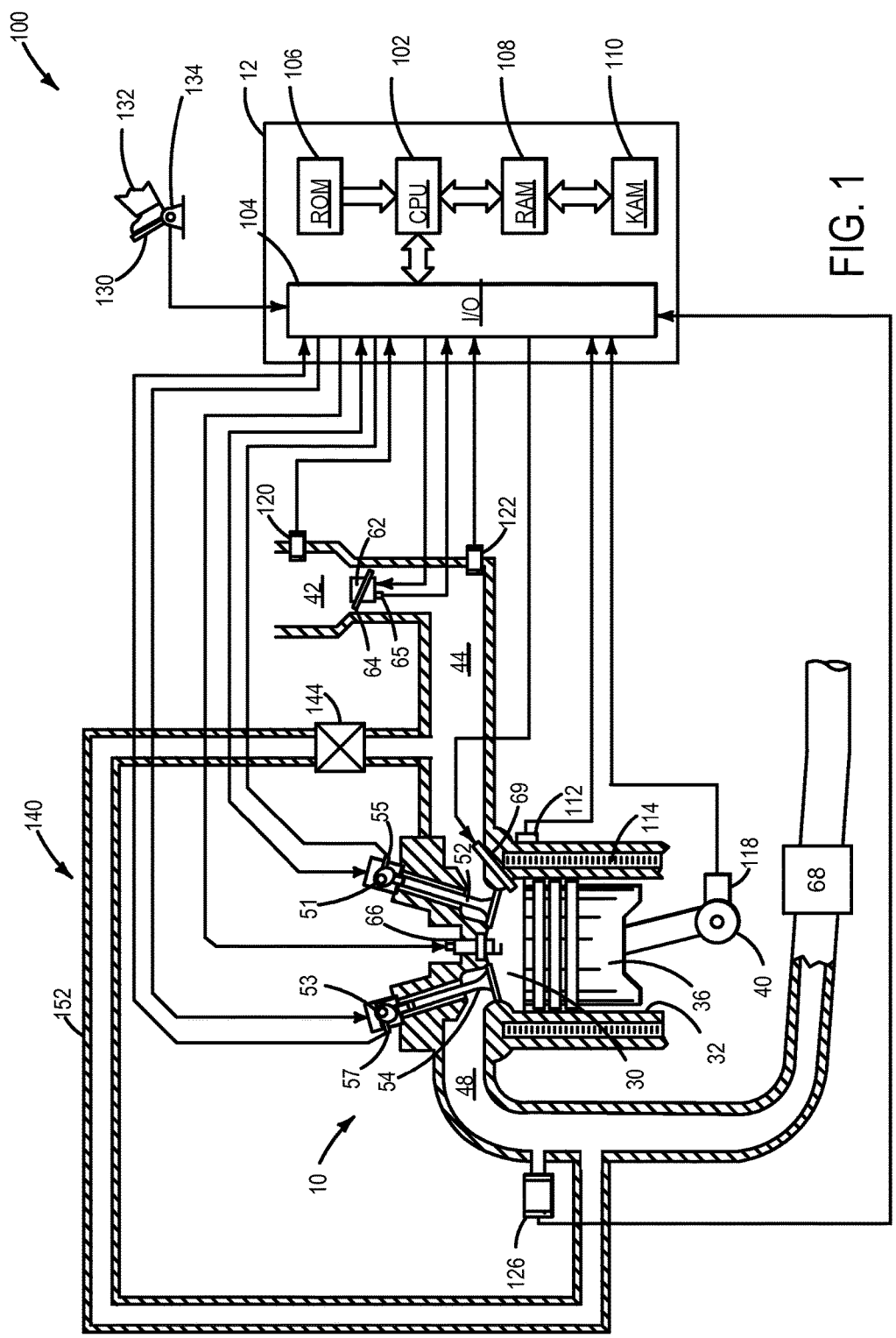
FIG. 1 shows an example engine with a single cylinder.
Figure 2:
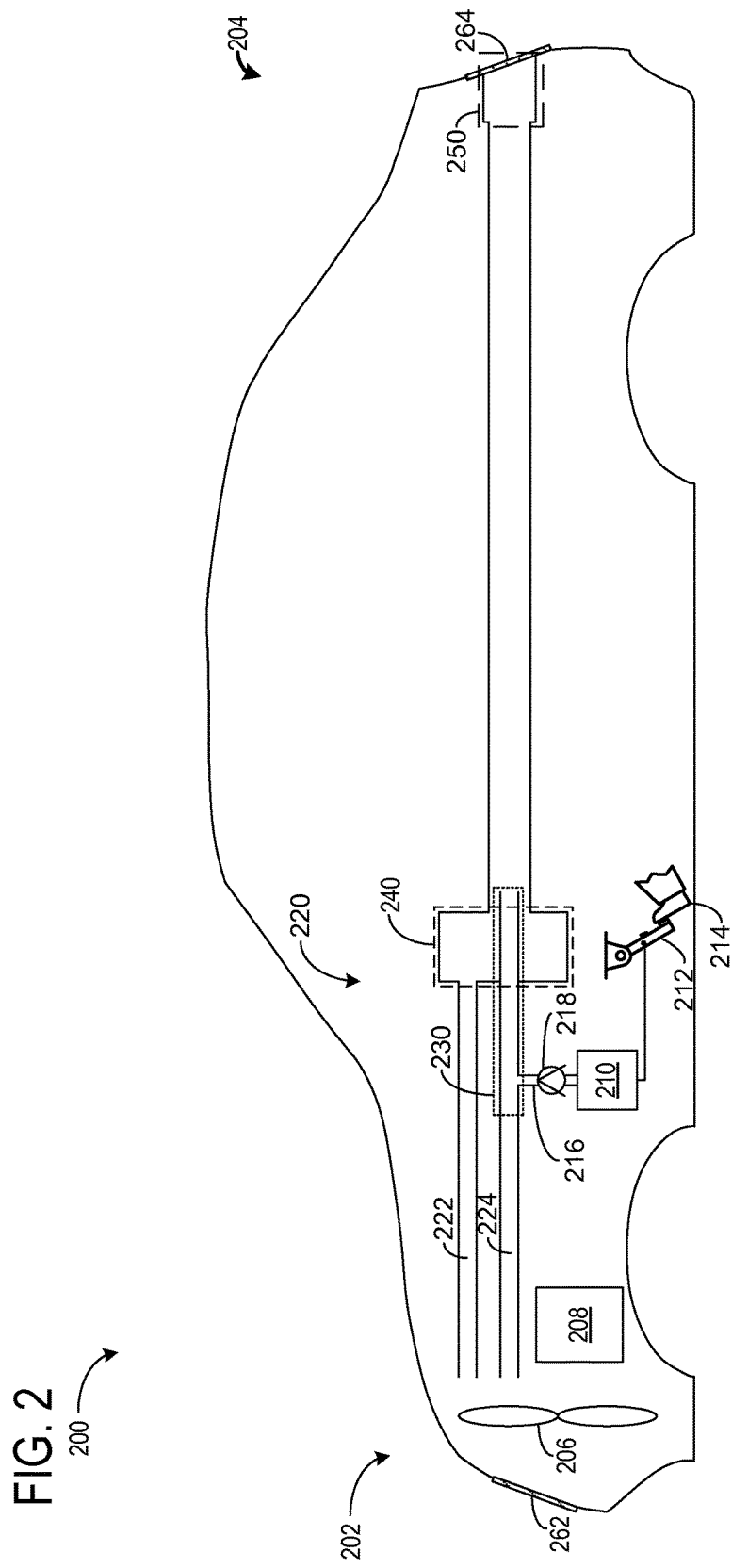
FIG. 2 shows a vehicle comprising the engine and an aspirator system coupled to a brake booster.
Figure 4:
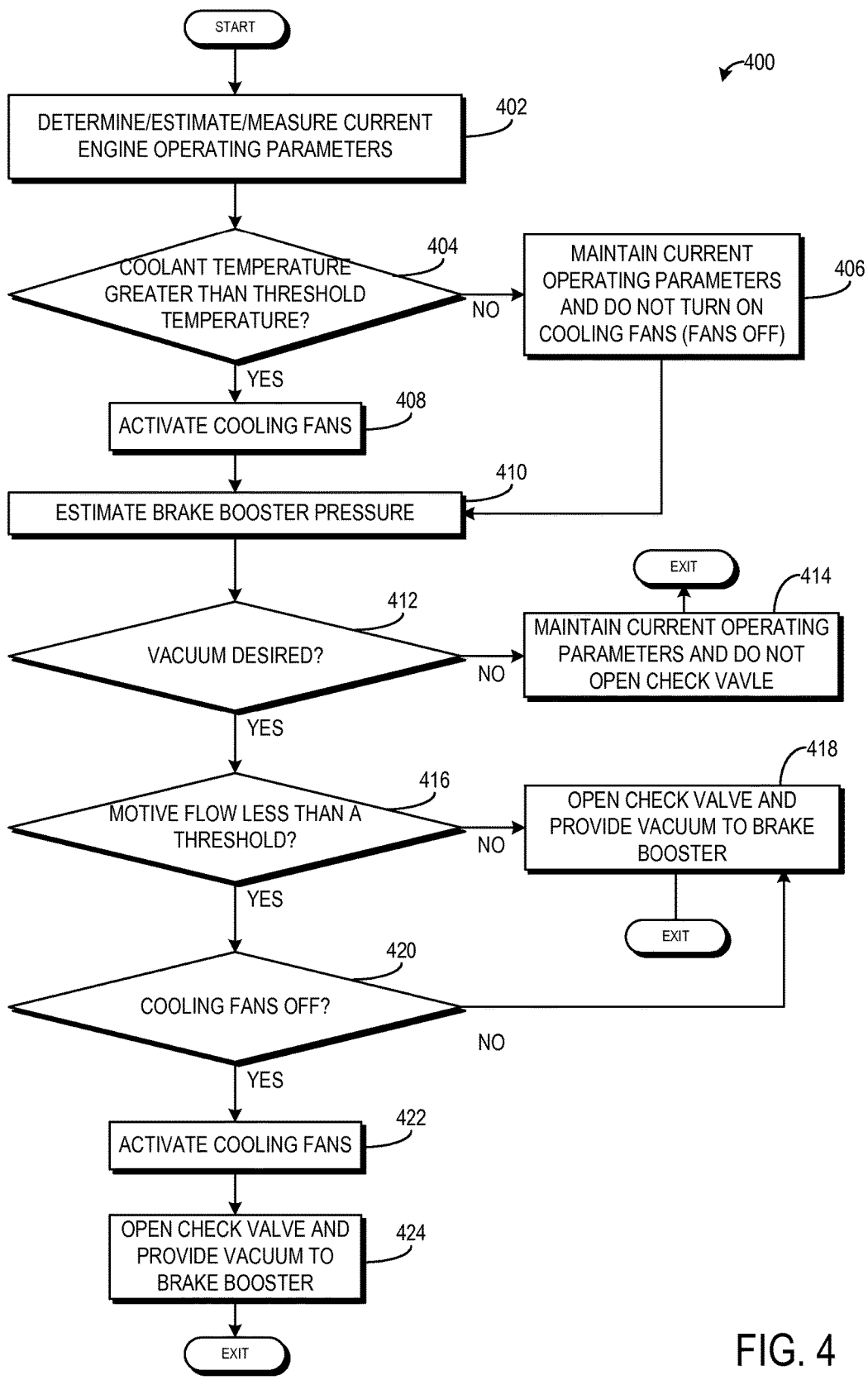
FIG. 4 shows a method for providing vacuum to the brake booster.
Figure 5:
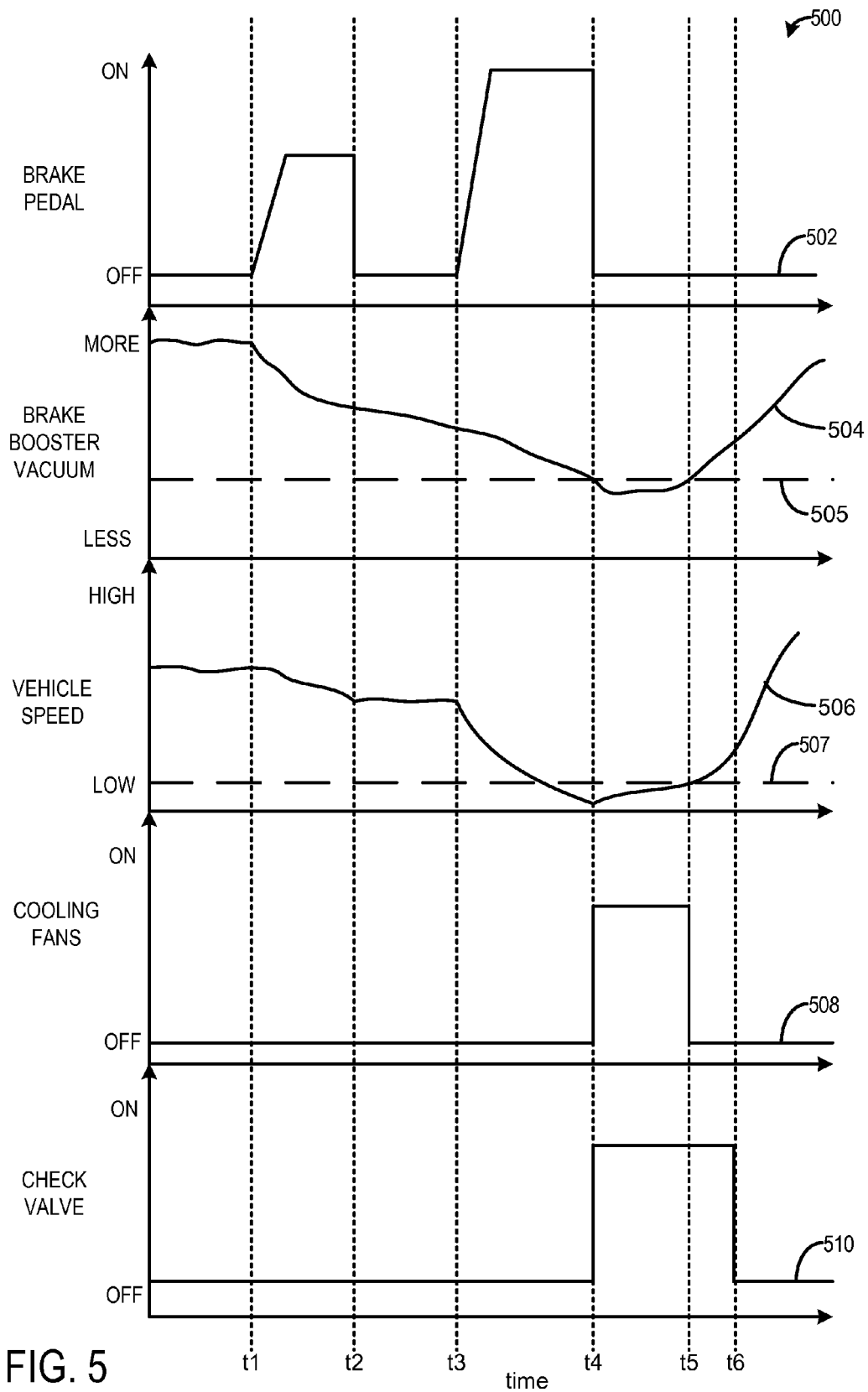
FIG. 5 shows a chart detailing vacuum level in the brake booster based on vehicle conditions.

The following description relates to an example of an aspirator system for providing vacuum to a brake booster. A general schematic of an engine is shown in FIG. 1. A vehicle with the engine and the aspirator coupled to the brake booster is shown in FIG. 2. First, second, and third aspirator portions are shown in detail in FIG. 3. The portions are all in fluid communication. The first portion is fluidly coupled to the brake booster when a check valve is in an open position. The aspirator system may draw suck flow from the brake booster while providing vacuum to the brake booster. The suck flow may mix with motive flow in the aspirator system and flow out the aspirator system without flowing to any intervening components therebetween. A method for providing vacuum to the brake booster is shown in FIG. 4. A chart showing brake booster vacuum level changes based on vehicle operations is shown in FIG. 5.

Figure 3:
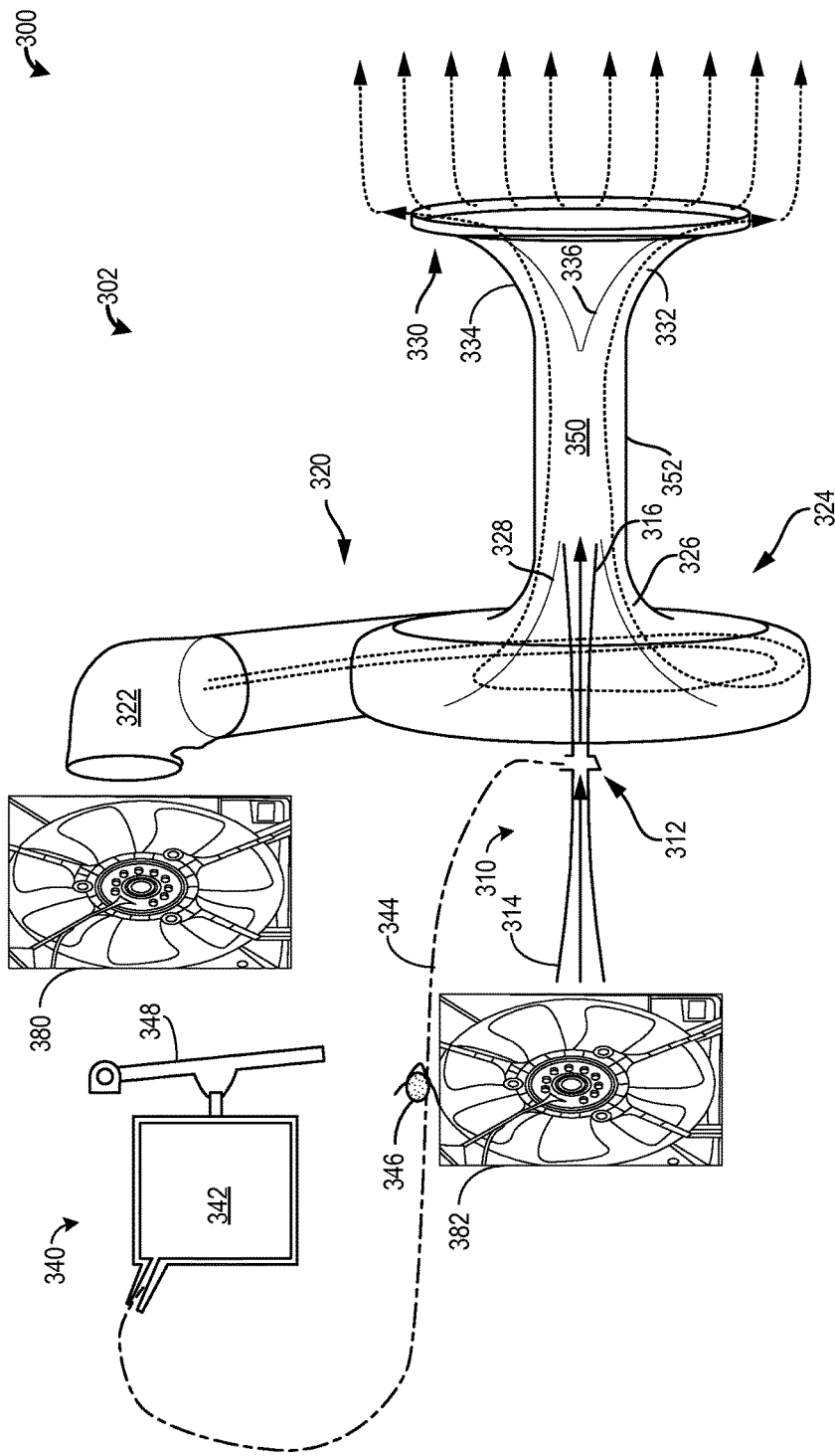
FIG. 3 shows a shape of first, second, and third aspirator geometries of the aspirator system.

FIG. 3 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example.

Continuing to FIG. 1, a schematic diagram showing one cylinder of a multi-cylinder engine 10 in an engine system 100, which may be included in a propulsion system of an automobile, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 68 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 68 is shown arranged along the exhaust passage 48 downstream of the exhaust gas sensor 126. The device 68 may be a three way catalyst (TWC), $NO_x$ trap, selective catalytic reductant (SCR), various other emission control devices, or combinations thereof.

In some examples, during operation of the engine 10, the emission control device 68 may be periodically reset by operating at least one cylinder of the engine within a particular air-fuel ratio.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller.

FIG. 2 shows a vehicle 200 comprising an engine 208 with a cooling fan 206. The engine 208 may be used similarly to engine 10 of FIG. 1. The vehicle 200 further comprises a front end 202 and a back end 204. The engine 208 and the cooling fan 206 are proximal to the front end 202. The vehicle 200 further comprises a front grill 262 and a rear grill 264 which may admit motive flow and expel motive flow from the vehicle, respectively.

The cooling fan 206 may be activated in response to a coolant temperature exceeding a threshold temperature. The temperature threshold may be based on a temperature where the coolant may no longer sufficiently cool an engine and or one or more engine components. Coolant temperatures may rise during low vehicle speeds and/or idle when motive air through a radiator of the engine 208 is unable to sufficiently cool an engine coolant. In response to the insufficient motive air, the cooling fan 206 may be activated to decrease a temperature of the engine and/or its components. In this way, the cooling fan 206 may be activated during low vehicle speeds. It will be appreciated by someone skilled in the art that the fan 206 may also be activated during higher vehicle speeds in order to cool the engine 208 and/or one or more of its components.

A brake booster 210 is shown coupled to a brake pedal 212. The brake booster 210 may include an internal vacuum reservoir to amplify force provided by a foot 214 to the brake pedal 212. Vacuum is consumed when the pedal 212 is depressed resulting in a pressure increase (or loss of vacuum) of the brake booster. A vacuum line 216 with a check valve 218 couples the brake booster 210 to an aspirator system 220. The aspirator system 220 may provide vacuum to replenish the vacuum of the brake booster when the check valve 218 is open. The check valve opens when the vacuum of the brake booster 210 decreases below a minimum threshold vacuum. The minimum threshold vacuum may be based on a vacuum of a first vacuum portion 230 (e.g., 40000 Pa).

The aspirator system 220 generates vacuum via motive flow from the front grill 262 flowing through a first inlet 222 and a second inlet 224. Motive flow provided to the first 222 and second 224 inlets may be fluidly separate from the motive flow provided to the engine 208. The second inlet 224 is in fluid communication with a first aspirator portion 230, indicated by small dashed lines, located proximal to the front end 202. The first aspirator portion 230 may be a venturi passage with the vacuum line 216 being coupled to a narrowest portion of the venturi passage. The check valve 218 may remain in a closed position if the vacuum of the brake booster is greater than the minimum vacuum threshold to prevent fluid communication between the booster 210 and first aspirator portion 230. For example, the valve 218 may open following the brake pedal being depressed and the vacuum reservoir vacuum level decreasing below the minimum threshold vacuum.

When the check valve 218 is open and the first portion 230 provides vacuum to the brake booster 210, suck flow from the brake booster flows into the first portion and mixes with motive flow. The mixture may then flow through the aspirator system 220 before flowing through the rear grills 264, without flowing to the engine or any engine components.

A second aspirator portion 240, indicated by medium dashed lines, and a third aspirator portion 250, indicated by large dashed lines, are further included in the aspirator system. Large dashed lines are bigger than medium dashed lines which are bigger than small dashed lines. The second aspirator portion 240 may be a volute shape (similar to a turbine) surrounding an outlet of the first aspirator portion 230. The third aspirator portion 250 may be a cone shape and expel motive air through the rear end 204 into an ambient atmosphere. The second aspirator portion 240 is proximal to and overlaps a portion of the first aspirator portion 230. The third aspirator portion 250 is proximal to the rear end 204 and is fluidly coupled with the rear grill 264.

The aspirator system 220 generates vacuum based on motive air flowing through the first 230, second 240, and third 250 aspirator portions. Motive flow flows through the first inlet 222 and second inlet 224 into the second portion 240 and the first portion 230, respectively. The motive flows from the first 230 and second 240 portions combine upstream of the third portion 250 before being expelled into an ambient atmosphere. Vacuum generated by the third portion may increase vacuum generated by the second portion, which may increase vacuum generated by the first portion. Specifically, the third vacuum geometry 250 may generate a vacuum of 5 kPa, the second vacuum geometry 240 may generate a vacuum of 15 kPa, and the first vacuum geometry 230 may generate a vacuum of 40 kPa.

During instances of low motive flow, the cooling fan 206 may be activated to provide motive flow through the first 222 and second 224 inlets. In this way, vacuum may be provided by the aspirator system 220 to the brake booster 210 during high vehicle speeds, low vehicle speeds, and vehicle stops.

As an example, the vehicle may use stored vacuum within the brake booster while depressing the brake pedal to slow from a high speed to a stop. If the pressure within the brake booster surpasses a threshold pressure, then the check valve may open, indicating a demand to decrease pressure within the brake booster. As an operator accelerates the vehicle from the stop, the motive air may be insufficient to provide the desired vacuum to the brake booster. Thus, the cooling fan may be activated to provide all of or a portion of the motive air through the aspirator system to generate a sufficient vacuum. In this way, the cooling fan may be used to both cool the engine and/or one or more engine components and provide motive air to the aspirator system. The cooling fan may be deactivated in response to a vehicle speed generating a motive flow greater than a threshold flow or to a coolant temperature decreasing below the threshold temperature. If the coolant temperature decreases below the threshold temperature while the motive flow is less than the threshold flow, the cooling fans may be deactivated to prevent further coolant temperature decrease in a first condition. In a second condition, the cooling fans may remain active in response to the coolant temperature being below the threshold temperature and the motive flow being less than the threshold flow to provide vacuum to the brake booster.

Additionally or alternatively, the aspirator system may provide vacuum to the brake booster simultaneously to the vehicle using vacuum stored within the brake booster. The aspirator system continuously receives motive flow during vehicle motion and may receive motive flow during vehicle stops from the cooling fans. Thus, the aspirator system may continuously generate vacuum independent of the brake booster desiring vacuum. If the brake booster desires vacuum while the brake pedal is depressed, then the check valve may open to fluidly connect the brake booster to the aspirator system. In this way, vacuum of the brake booster may be replenished while braking with assistance from the brake booster.

As depicted, the aspirator system 220 and the brake booster 210 are not in fluid communication with the engine 208 and/or any engine components such as those previously presented in FIG. 1 (e.g., intake manifold, compressor, turbine, etc.). In this way, no electrical components are used for the operation of the aspirator system 220 and/or the brake booster 210. Motive air flows into the aspirator system 220 via the front end 202 and out the aspirator system 220 via the rear end 204.

FIG. 2 depicts a vehicle with a system comprising an engine with one or more cooling fans and an aspirator system with at least one inlet downstream of and in fluid communication with the one or more cooling fans. First, second, and third aspirator portions of the aspirator system are fluidly coupled and capable of receiving motive flow from a front grill and expelling the motive flow out through a rear grill. A brake booster comprising a passage with a check valve is fluidly coupled with the first aspirator portion with no other intervening components located therebetween. The brake booster may provide vacuum when an operator depresses a brake pedal of the vehicle. The first aspirator portion provides vacuum to and receives suck flow from the brake booster when the check valve is open. The suck flow mixes with the motive flow in the first portion and flows toward the third portion and out the rear grill without flowing into the engine.

FIG. 3 shows a system 300 with an aspirator system 302 in fluid communication with a vacuum reservoir 342 of a brake booster 340. As described above, the brake booster 340 may use stored vacuum from the vacuum reservoir 342 to amplify a braking signal from an operator depressing a brake pedal 348. The aspirator system 302 may replenish the vacuum reservoir 342 in response to the vacuum of the reservoir decreasing below the minimum threshold vacuum. The aspirator system 302 and the brake booster 340 are fluidly connected to an ambient atmosphere and a brake system. The aspirator system 302 and the brake booster 340 are not in fluid communication with an engine and or any engine components (e.g., intake manifold, exhaust manifold, compressor, turbine, cylinders, etc). Dashed arrows depict a direction of motive flow through the aspirator system 302.

The aspirator system 302 comprises three different aspirator generating geometries each of which may rely upon flowing motive air from a larger flow path to a smaller flow path. Speed increases and pressure decreases (e.g., vacuum increases) as air flows from the larger path to the smaller path. The three different geometries may be arranged in series and in fluid communication with each other to build vacuum across the aspirator system 302. The aspirator system 302 comprises of three portions namely, a first aspirator portion 310, a second aspirator portion 320, and a third aspirator portion 330. The first 310, second 320, and third 330 aspirator portions generate vacuum during vehicle speeds greater than a threshold speed The third aspirator portion 330 is further downstream (e.g., nearer a rear end of a vehicle) than the first 310 and second 320 aspirator portions. An outlet 332 is located between outer 334 and inner 336 walls and is in fluid communication with an ambient environment through a rear grills of a vehicle. As an example, motive air flowing through the outlet 332 flows outside the vehicle and into the atmosphere. A path of the outlet 332 may be marginally bigger at an upstream end compared to at the rear end of the vehicle due to geometries of the outer 334 and inner 336 walls. A cross-section of the outlet 334 is substantially annular allowing motive air to flow out the rear end in a toroidal (ring) shape. It will be appreciated by someone skilled in the art that the outlet 334 may comprise other suitable shapes.

The outer 334 and inner 336 walls are spaced away from each other by a width of the outlet 332. The outer 334 and inner 336 walls may be substantially cone-shaped (e.g., conical) with a substantially circular cross-section. The inner wall 336 may be coupled to the outer wall 334 via supports (not shown) located between and fixed to the walls. The walls are closer to each other near the rear end of the vehicle compared to near the front end. In other words, the width (e.g., a space) between the outer 334 and inner 336 walls decreases toward the rear of the vehicle compared to near the engine. In this way, motive air flowing through the outlet 332 increases in speed and decreases in pressure (e.g., increases vacuum) as it approaches the rear end of the vehicle. In one example, the vacuum produced is equal to 5 kPa. Alternatively, the vacuum produced may be less than or greater than 5 kPa.

The second aspirator portion 320 is located adjacent to and overlaps a portion of the first portion 310. The second portion 320 comprises an inlet 322 located downstream of a first cooling fan 380. As described above, the first cooling fan 380 may provide motive air during low vehicle speeds and/or vehicle stops. A second portion body 324 is fluidly coupled to the inlet 322 and a connecting passage 350 fluidly coupling the second aspirator portion 320 to the third aspirator portion 330. The aspirator body 324 may be a volute (spiral) shape. Motive air from the inlet 322 flows in a substantially circular direction around an interior wall 328 of the second portion body 324 before annularly flowing into the connecting passage 350.

A second portion outlet 326 is located between the interior wall 328 and a connecting wall 352 of the connecting passage 350. The second portion outlet 326 is wider near the second portion body 324 compared to near the connecting passage 350. The second portion outlet 326 is substantially ring shaped and directs motive air into the connecting passage 350 along the connecting wall 352 in a similar ring shape. Motive air may be pulled through the second portion outlet 326 by vacuum generated at the third aspirator portion 330. Motive air flowing through the second portion outlet 326 decreases in pressure and increases in speed and creates a vacuum. The vacuum generated by the second aspirator portion is exactly 15 kPa in one example. Alternatively, the vacuum generated by the second aspirator portion may be greater than or less than 15 kPa. In this way, the vacuum generated by the second aspirator portion 320 is more than the vacuum generated by the third aspirator portion 330.

The first aspirator portion 310 is the furthest upstream (e.g., nearest a front end of a vehicle) of the three portions of the aspirator system 302. The first aspirator portion 310 is substantially linear and extends through a spiral of the second aspirator portion 320. The first aspirator portion comprises an upstream passage 314 and a downstream passage 316 with a venturi passage 312 located therebetween. Motive flow flows through the venturi passage 312 increasing in speed and decreasing in pressure, resulting in a vacuum. The upstream passage 314 is located downstream of a second cooling fan 382, serving as an inlet for the first aspirator portion 310. The downstream passage 316 is fluidly coupled with the connecting passage 350 and extends through an opening of the interior wall 328 (e.g., through the spiral of the second portion body 324). An extreme end of the downstream passage 316 is interior to an extreme end of the interior wall 328 of the second portion 320. The second aspirator portion 320 may assist a motive air outflow through the downstream passage 316 and increase a vacuum generated by the first portion. The downstream passage 316 directs motive air to flow inside of the motive air from the second portion outlet 326. In this way, motive air from the second portion outlet 326 flows between the connecting wall 352 and the motive air from the downstream passage 316.

The brake booster 340 is fluidly coupled to the first aspirator portion 310 at a narrowest portion of the venturi passage 312 via a vacuum line 344. The narrowest portion of the venturi passage 312 may generate a more vacuum than other portions of the venturi passage 312. In one example, the vacuum generated at the narrowest portion is 40 kPa. Alternatively, the vacuum generated at the narrowest portion may be greater than or less than 40 kPa. In this way, the first aspirator portion 310 generates more vacuum than the second 320 and/or third 330 aspirator portions.

A check valve 346 is located along the vacuum line 344 and may open based on the vacuum generated by the first aspirator portion 310. For example, the check valve may open when a vacuum of the vacuum reservoir 342 is less than a minimum threshold vacuum, which is based on a pressure of the first aspirator portion 310. When the valve 346 is open, the first aspirator portion 310 provides vacuum to the vacuum reservoir 342 by drawing air from the reservoir 342 into the first aspirator portion 310.

Generating vacuum in the aspirator system 302 includes flowing motive air through the venturi passage 312, through the spiral of the second portion body 324, and through the annular outlet 332.

FIG. 4 shows a method 400 for operating an aspirator system for providing vacuum to a brake booster. The method 400 may further provide instructions for operating one or more cooling fans for providing motive air to the aspirator system during vehicle conditions producing insufficient motive air. Instructions for carrying out method 400 may be executed by a controller (e.g., controller 12 of FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below. For example, the controller 12 may adjust operation of one or more cooling fans (e.g., cooling fans 380 and 382 of FIG. 3) during vehicle operation.

The method 400 may be described in reference to components previously presented. Specifically, the method 400 may be described in reference to vehicle 200, brake pedal 212, brake booster 340, aspirator system 302, and check valve 346 of FIGS. 2 and 3.

The method 400 begins at 402 where the method 400 includes determining, estimating, and/or measuring current engine operating parameters. The current engine operating parameters may include engine speed, coolant temperature, engine load, vehicle speed, manifold air pressure, manifold vacuum, and air/fuel ratio.

At 404, the method 400 includes determining if the coolant temperature is greater than a threshold temperature. The threshold temperature range may be based on a desired coolant operating temperature (e.g., 185° F.). Coolant temperatures below the threshold temperature may be too cold and lead to one or more of a catalyst not lighting off, increased condensate formation, and freezing. If the coolant temperature is less than the threshold temperature, then the method 400 proceeds to 406 to maintain current engine operating parameters and does not activate the cooling fans. The method may proceed to 410, as will be described below.

If the coolant temperature is greater than the threshold temperature, then the method 400 may proceed to 408 to activate the cooling fans to provide cooling to an engine compartment.

The fans may be variable speed fans such that a flow rate provided by the fans is controlled by a controller (e.g., controller 12).

At 410, the method 400 includes estimating a brake booster pressure. The brake booster pressure may be estimated based on a duration of brake pedal depression and an amount of vacuum replenishment, wherein a greater duration corresponds with a higher brake booster pressure and a greater amount of vacuum replenishment corresponds with a lower brake booster pressure.

At 412, the method 400 includes determining if vacuum is desired by the brake booster. Vacuum may be desired if the brake booster pressure is less than a vacuum (e.g., minimum threshold vacuum) of a first aspirator portion of the aspirator system (e.g., first aspirator portion 310 of the aspirator system 302). Additionally or alternatively, vacuum may also be desired based on the duration of brake pedal depression and miles driven. If vacuum is not desired, then the method 400 proceeds to 414 to maintain current operating parameters and does not open the check valve located between the brake booster and the aspirator system. Motive air may flow through the aspirator system despite the check valve remaining closed. In this way, motive air is continuously provided to the aspirator system while the vehicle is in motion.

If vacuum is desired, then the method 400 proceeds to 416 to determine if motive air is less than a threshold flow rate. The threshold flow rate may be based on a motive air flow rate capable of generating vacuum in the aspirator system. The motive air may be below the threshold flow rate for a vehicle speed less than a threshold speed (e.g., vehicle driving at a low speed or at a stop). The motive air may be greater than the threshold flow rate for a vehicle driving at mid or high speeds. If the motive air is not less than the threshold flow rate, then the method 400 proceeds to 418 to open the check valve and provide vacuum to the brake booster from the aspirator system. One or more cooling fans are not activated in order to provide motive flow to the aspirator system. However, it will be appreciated that the cooling fans may be activated based on other conditions (e.g., coolant temperature exceeding the threshold temperature). The check valve is automatically opened by a pressure of the brake booster being greater than a pre-loaded pressure of the check valve. As an example, the check valve may be spring actuated and a pressure of the spring is overcome when the brake booster pressure exceeds the threshold pressure (e.g., 40 kPa). The check valve is not opened by an electronic signal.

If the motive air is less than the threshold flow rate, then the method 400 proceeds to 420 determine if the cooling fans are off. If the cooling fans are already activated due to other vehicle conditions (e.g., coolant temperature is greater than the threshold temperature), then the method 400 proceeds to 418 as described above.

If the cooling fans are off and the motive flow is less than the threshold flow rate, then vacuum may not be produced by the aspirator system and the method 400 proceeds to 422 to activate the cooling fans. The controller may signal activation of the cooling fans in response to the determination of the motive air being less than the threshold flow rate. The cooling fans rotate and provide motive flow to both the first aspirator portion and a second aspirator portion of the aspirator system.

Additionally or alternatively, the cooling fans may not be activated in response to the motive flow being less than the threshold flow rate due to the coolant temperature being less than the threshold temperature. In this way, the fans remain inactive to prevent condensate formation and/or condensate freezing which may degrade engine performance under some conditions. Under other conditions, the cooling fans may be activated in response to the motive flow being less than the threshold flow rate and the coolant temperature being less than the threshold temperature to provide vacuum to the brake booster. Engine operation may be adjusted to prevent condensate formation and/or freezing by increasing EGR, retarding spark, decreasing an air/fuel ratio, increasing a primary injection pressure, increasing a second injection volume, and other suitable adjustments capable of increasing coolant temperature. Additionally or alternatively, the adjustments may further include disabling coolant flow. Furthermore, a rotation speed of the cooling fans may be reduced to a minimum speed capable of providing the desired flow to the aspirator system for producing vacuum.

By doing this, cooling of the coolant is decreased while vacuum is generated by the aspirator system and provided to the brake booster.

At 424, the method 400 includes opening the check valve and providing vacuum to the brake booster from the aspirator system. The method 400 may continue to operate the cooling fans until the motive flow exceeds the threshold flow rate or until the coolant temperature are less than the threshold temperature. Additionally or alternatively, the cooling fans may be continuously operated.

FIG. 5 shows a chart 500 depicting an example brake booster vacuum level based on vehicle operations and modifications of vehicle operations. Chart 500 shows brake pedal position at plot 502, brake booster vacuum level at plot 504, vehicle speed at plot 506, cooling fan status at plot 508, and check valve position at plot 510. All of the above are plotted against time on the X-axis. Line 505 represents a minimum threshold vacuum in the brake booster vacuum reservoir. Line 507 represents a threshold vehicle speed unable to provide sufficient motive flow to the aspirator system to generate vacuum.

Prior to time t1, a vehicle may be moving in a steady state condition with moderate speed. Brake pedal is in a released (or "off") position and brake booster vacuum is sufficient, as indicated by the brake booster vacuum 504 being higher than the minimum threshold vacuum 505. The check valve between the brake booster and the aspirator system is closed due to the sufficient vacuum in the brake booster. The brake booster and the aspirator system are not in fluid communication when the check valve is in the closed position. The cooling fans are not activated (or "off") due to sufficient motive flow being delivered to the aspirator system, as indicated by the vehicle speed 506 being above the threshold vehicle speed line 507.

At t1, the brake pedal may be applied by the operator upon which vacuum in the brake booster is consumed to enable wheel braking. Between t1 and t2, as the brake application continues, the brake booster vacuum decreases (e.g., a pressure in the brake booster vacuum reservoir increases). However, the level of vacuum within the reservoir remains above the minimum threshold vacuum 505 and the check valve remains closes. Due to the brake application, vehicle speed decreases but does not decrease to a vehicle speed less than the threshold speed 507. Thus, sufficient motive air is provided to the aspirator system and the cooling fans are not activated.

At t2, the brake pedal is released and the vehicle resumes steady state travel conditions, similar to those prior to t1, between t2 and t3. The brake booster vacuum remains above the minimum threshold vacuum 505 and the vehicle speed remains above the threshold speed 507 and as a result, the check valve remains closed and the cooling fans remain deactivated.

At t3, the brake pedal may be applied again. Brake pedal application at t3 may be more forceful (e.g., depressed further and faster) as compared to the brake pedal application at t1. As a result, a steeper drop in vacuum level within the brake booster vacuum is observed during the brake application between t3 and t4. However, the brake booster vacuum remains above the minimum threshold vacuum 505. The vehicle speed decreases due to the brake application and falls below the threshold speed 507 (e.g., a low speed or vehicle stop). Vehicle speeds below the threshold speed 507 may not be able to provide the aspirator system with a sufficient motive flow for generating vacuum. However, the cooling fans remain in an off position because the check valve is not open. In this way, the brake booster does not desire vacuum and a sufficient motive flow is not desired by the aspirator system.

At t4, the brake booster vacuum falls below the minimum threshold vacuum 505. In response, the check valve moves to an open position. The brakes may be released at t4. The vehicle speed remains below the threshold speed 507 resulting in an activation of the cooling fans to provide the desired motive flow to the aspirator system to generate vacuum. Between t4 and t5, an operator may depress an accelerator pedal resulting in the vehicle speed increasing. The cooling fans remain active for a total duration of the vehicle speed being less than the threshold speed 507 in combination with the check valve being open. The generated vacuum from the aspirator system is applied to the brake booster until vacuum in the brake booster is above the minimum threshold vacuum 505.

In one embodiment, additionally or alternatively, the brakes may not be released at t4 and vacuum may be consumed for braking applications. As described above, the check valve is opened as the brake booster vacuum falls below the minimum threshold vacuum 505. Thus, the aspirator system may provide vacuum to the brake booster simultaneously to the brake booster providing vacuum for braking applications.

At t5, the accelerator pedal remains depressed increasing the vehicle speed beyond the threshold speed 507. The cooling fans are deactivated in response to sufficient motive air being provided for generating vacuum in the aspirator. Between t5 and t6, the brake booster vacuum level continues to increase but remains below the minimum threshold vacuum 505. The check valve is open. Thus, the aspirator system generates vacuum via motive flow produced from vehicular movement and provides the vacuum to the brake booster.

At t6, the brake booster vacuum surpasses the minimum vacuum threshold 505. The check valve closes in response to the brake booster vacuum increase and the brake booster and aspirator system are no longer in fluid communication. After t6, the accelerator pedal may continue to be depressed resulting in the vehicle speed increasing. The brake pedal may be released. The check valve may be closed. The cooling fans may be deactivated.

In this way, a brake booster vacuum may be replenished without flowing air from a vacuum reservoir to an intake manifold or other engine component. An aspirator system generates vacuum with motive flow and provides the vacuum to the brake booster when a check valve is open. The check valve may be automatically opened when the vacuum of the brake booster is less than a minimum threshold vacuum. One or more cooling fans may be located upstream of motive flow inlets of the aspirator system to generate motive flow at low vehicle speeds and/or stops. By doing this, vacuum may be provided from the aspirator system to the brake booster during a spectrum of vehicle conditions. The technical effect of using an aspirator system and brake booster system fluidly separated from an engine and its components is to eliminate usage of a control valve or other control system device for the replenishment of vacuum to the brake booster.

An aspirator system for a vehicle includes a volute shaped aspirator with a linear aspirator protruding through a spiral of the volute aspirator, the linear aspirator comprising a venturi passage fluidly coupled to a brake booster, and where the aspirators are fluidly coupled to front or rear grills via a conical aspirator with no other intervening components located therebetween. In a first example of the aspirator system, the conical aspirator is the furthest downstream and the linear aspirator is the furthest upstream of the aspirators. In a second example of the aspirator system optionally including the first example, further comprising a check valve located in a passage fluidly coupling the brake booster to the venturi passage. A third example of the aspirator system optionally includes one or more of the first and second example, and further includes, the check valve opens in response to a vacuum of the brake booster being less than a minimum threshold vacuum. A fourth example of the aspirator system optionally includes one or more of the first through third examples, and further includes, the volute shaped aspirator and the linear aspirator further comprise inlets for receiving motive air flow from the front grill. A fifth example of the aspirator system optionally includes one or more of the first through fourth examples, and further includes, the inlets are located downstream of fans. A sixth example of the aspirator system optionally includes one or more of the first through fifth example, and further includes, the aspirators generate vacuum during vehicle speeds greater than a threshold speed.

A method for an aspirator system includes generating vacuum via motive flow in an aspirator system when a vehicle speed is greater than a threshold speed or when at least one cooling fan is activated, providing vacuum from the aspirator system to a brake booster in response to a check valve being open, and mixing suck flow from the brake booster with motive flow in the aspirator system and flowing the mixture directly out a rear grill without flowing the mixture through any other components. A first example of the method includes where activating the cooling fan is in response to the vehicle speed being less than the threshold speed. A second example of the method optionally including the first example further includes the check valve being closed when a brake booster vacuum is greater than a minimum threshold vacuum. A third example of the method optionally including the first and/or second examples further includes where generating vacuum includes flowing motive flow through a venturi passage, a spiral shaped passage, and an annular passage of the aspirator system. A fourth example of the method optionally including the first through third examples further includes activating the cooling fan is in response to a coolant temperature being greater than a threshold temperature. A fifth example of the method optionally including the first through fourth examples further includes activating the cooling fan in response a combination of a vehicle speed being less than the threshold speed and the coolant temperature being less than the threshold temperature further includes one or more or retarding spark, disabling coolant flow, and advancing spark timing.

An aspirator system of a vehicle comprising an engine with one or more cooling fans, an aspirator system with at least one inlet downstream of and in fluid communication with the one or more cooling fans, a first, second, and third aspirator portions of the aspirator system fluidly coupled and capable of receiving motive flow from a front grill and expelling the motive flow out through a rear grill and a brake booster comprising a passage with a check valve fluidly coupled with the first aspirator portions with no other intervening components located therebetween. A first example of the system includes where the first aspirator portion is a venturi passage. A second example of the system optionally including the first example and further includes where the second aspirator portion is a volute shape, and where the first aspirator portion extends through a spiral of the second aspirator portion. A third example of the system optionally including the first and/or second examples and further includes where the third aspirator portion is a cone shape with an outlet located between outer and inner walls of the third portion, where the outlet is an annular shape, and where a space between the outer and inner walls decreases toward the rear grill. A fourth example of the system optionally includes one or more of the first through third examples and further includes where a connecting passage fluidly coupling the first and second aspirator portions to the third portion. A fifth example of the system optionally includes the first through fourth examples and further includes where the first aspirator portion receives suck flow from the brake booster when the check valve is open and flows a mixture of the suck flow and the motive flow toward the rear grill. A sixth example of the aspirator system optionally includes one or more of the first through fifth examples and further includes where the first aspirator portion outlet flow is linearly shaped and the second and third aspirator portion outlet flows are annularly shaped. A seventh example of the aspirator system optionally includes one or more of the first through sixth examples and further includes where the check valve is spring loaded with a predetermined tension based on a minimum threshold vacuum. An eighth example of the system optionally includes one or more of the first through seventh examples and further includes where the check valve is not electrically actuated.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   generating vacuum via motive flow in an aspirator system when a vehicle speed is greater than a threshold speed or when at least one cooling fan is activated;
   providing vacuum from the aspirator system to a brake booster in response to a check valve being open; and
   mixing suck flow from the brake booster with motive flow in the aspirator system and flowing the mixture directly out a rear grill without flowing the mixture through any other components.

2. The method of claim 1, wherein activating the cooling fan is in response to the vehicle speed being less than the threshold speed or a coolant temperature being greater than a threshold temperature.

3. The method of claim 2, wherein activating the cooling fan in response to a combination of the vehicle speed being less than the threshold speed and the coolant temperature being less than the threshold temperature further includes one or more or retarding spark, disabling coolant flow, and advancing spark timing.

4. The method of claim 1, wherein generating vacuum includes flowing motive flow through a venturi passage, a spiral shaped passage, and an annular passage of the aspirator system.

* * * * *